(12) United States Patent
Basu Mallick et al.

(10) Patent No.: US 11,589,206 B2
(45) Date of Patent: Feb. 21, 2023

(54) PERFORMING CONTENTION RESOLUTION FOR SYSTEM INFORMATION REQUESTS

(71) Applicant: Motorola Mobility LLC, Chicago, IL (US)

(72) Inventors: Prateek Basu Mallick, Oberursel (DE); Joachim Loehr, Wiesbaden (DE); Ravi Kuchibhotla, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 152 days.

(21) Appl. No.: 17/096,760

(22) Filed: Nov. 12, 2020

(65) Prior Publication Data

US 2021/0067941 A1 Mar. 4, 2021

Related U.S. Application Data

(63) Continuation of application No. 16/009,023, filed on Jun. 14, 2018, now Pat. No. 10,869,182.

(60) Provisional application No. 62/519,648, filed on Jun. 14, 2017.

(51) Int. Cl.
*H04W 8/00* (2009.01)
*H04W 74/08* (2009.01)
*H04W 48/14* (2009.01)
*H04W 48/08* (2009.01)
*H04W 88/02* (2009.01)
*H04W 48/16* (2009.01)

(52) U.S. Cl.
CPC ......... *H04W 8/00* (2013.01); *H04W 74/0833* (2013.01); *H04W 48/08* (2013.01); *H04W 48/14* (2013.01); *H04W 48/16* (2013.01); *H04W 88/02* (2013.01)

(58) Field of Classification Search
CPC .......................... H04W 8/00; H04W 74/0833
See application file for complete search history.

(56) References Cited

U.S. PATENT DOCUMENTS

2005/0026597 A1* 2/2005 Kim ...................... H04W 48/12
455/403
2018/0220288 A1* 8/2018 Agiwal ............... H04W 74/006
2018/0270868 A1* 9/2018 Ou ....................... H04W 72/042
(Continued)

OTHER PUBLICATIONS

Catt, "Procedures of on demand SI delivery and error handling", 3GPP TSG-RAN WG2 Meeting #98, R2-1704236, May 15-19, 2017, pp. 1-6.
(Continued)

*Primary Examiner* — Kevin C. Harper
(74) *Attorney, Agent, or Firm* — Kunzler Bean & Adamson (57) ABSTRACT

For acquiring system information instances, a method determines if one or more system information instances requested in a request message are received in a reply message from a base station. The request message includes a request bitmap indicating the requested system information instances. The reply message includes a reply bitmap indicating the system information instances in the reply message. The method acquires the system information instances indicated in the request bitmap and the reply bitmap from the reply message. In addition, the method requests the system information instances from the base station that are indicated in the request bitmap and not indicated in the reply bitmap.

20 Claims, 10 Drawing Sheets

(56) References Cited

U.S. PATENT DOCUMENTS

2018/0279377 A1* 9/2018 Lin .................. H04L 5/0055
2020/0029365 A1* 1/2020 Kim ................. H04W 48/14

OTHER PUBLICATIONS

Lenovo, Motorola Mobility, "Resolving Remaining FFSs", 3GPP TSG-RAN WG2 Meeting #99, R2-1708063, Aug. 21-25, 2017, pp. 1-4.

Lenovo, Motorola Mobility, "Random Access Procedure for On-Demand SI request", 3GPP TSG-RAN WG2 Meeting #99, R2-1708621, Aug. 21-25, 2017, pp. 1-4.

Lenovo, Motorola Mobility, "On Demand SI Request Remaining FFS", 3GPP TSG-RAN WG2 Meeting #101 R2-1803392, Feb. 26-Mar. 2, 2018, pp. 1-4.

NTT Docomo, Inc., "On-demand SI provisioning request", 3GPP TSG-RAN #97bis, R2-1703312, Apr. 3-7, 2017, pp. 1-4.

Samsung, "System Information Signaling Design in NR", GPP TSG-RAN WG2 Meeting #95, R2-164693, Aug. 22-26, 2016, pp. 1-6.

* cited by examiner

Request Message
205

Reply Message
210

215

| 1 | 0 | 0 | 0 | 0 | 0 | 0 | 0 | 0 | 1 |

| 1 | 0 | 0 | 0 | 0 | 0 | 0 | 0 | 0 | 1 |

215b

| 0 | 1 | 1 | 0 | 0 | 0 | 0 | 0 | 0 | 0 |

215c

| 1 | 1 | 1 | 0 | 0 | 0 | 0 | 0 | 0 | 1 |

215d

| 1 | 1 | 0 | 0 | 0 | 0 | 0 | 0 | 0 | 1 |

PERFORMING CONTENTION RESOLUTION FOR SYSTEM INFORMATION REQUESTS

CROSS-REFERENCE TO RELATED APPLICATIONS

This application is a continuation of and claims priority to U.S. patent application Ser. No. 16/009,023 entitled "PERFORMING CONTENTION RESOLUTION FOR SI REQUESTS" and filed on Jun. 14, 2018 for Prateek Basu Mallick, which is incorporated herein by reference, and which claims priority to U.S. Provisional Patent Application No. 62/519,648 entitled "PERFORMING CONTENTION RESOLUTION FOR SI REQUESTS" and filed on Jun. 14, 2017 for Prateek Basu Mallick, which is incorporated herein by reference.

FIELD

The subject matter disclosed herein relates to system information requests.

BACKGROUND

Description of the Related Art

Mobile devices may request system information from a base station.

BRIEF SUMMARY

A method for acquiring system information instances is disclosed. The method determines, by use of a processor, if one or more system information instances requested in a request message are received in a reply message from a base station. The request message includes a request bitmap indicating the requested system information instances. The reply message includes a reply bitmap indicating the system information instances in the reply message. The method acquires the system information instances indicated in the request bitmap and the reply bitmap from the reply message. In addition, the method requests the system information instances from the base station that are indicated in the request bitmap and not indicated in the reply bitmap. An apparatus also performs the functions of the method for acquiring system information instances.

A method for transmitting request messages is also disclosed. The method determines, by use of a processor, to request at least two system information instances from a base station. The method transmits a first request message requesting a first system information instance of the at least two system information instances. The method further transmits a second request message requesting a second system information of the at least two system information instances. The first and second request messages are one of a preamble and a time-frequency resource. The transmission of the first and second request messages is mutually independent, and each request message is transmitted as a Random Access Channel (RACH) request. An apparatus also performs the functions of the method for transmitting request messages.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
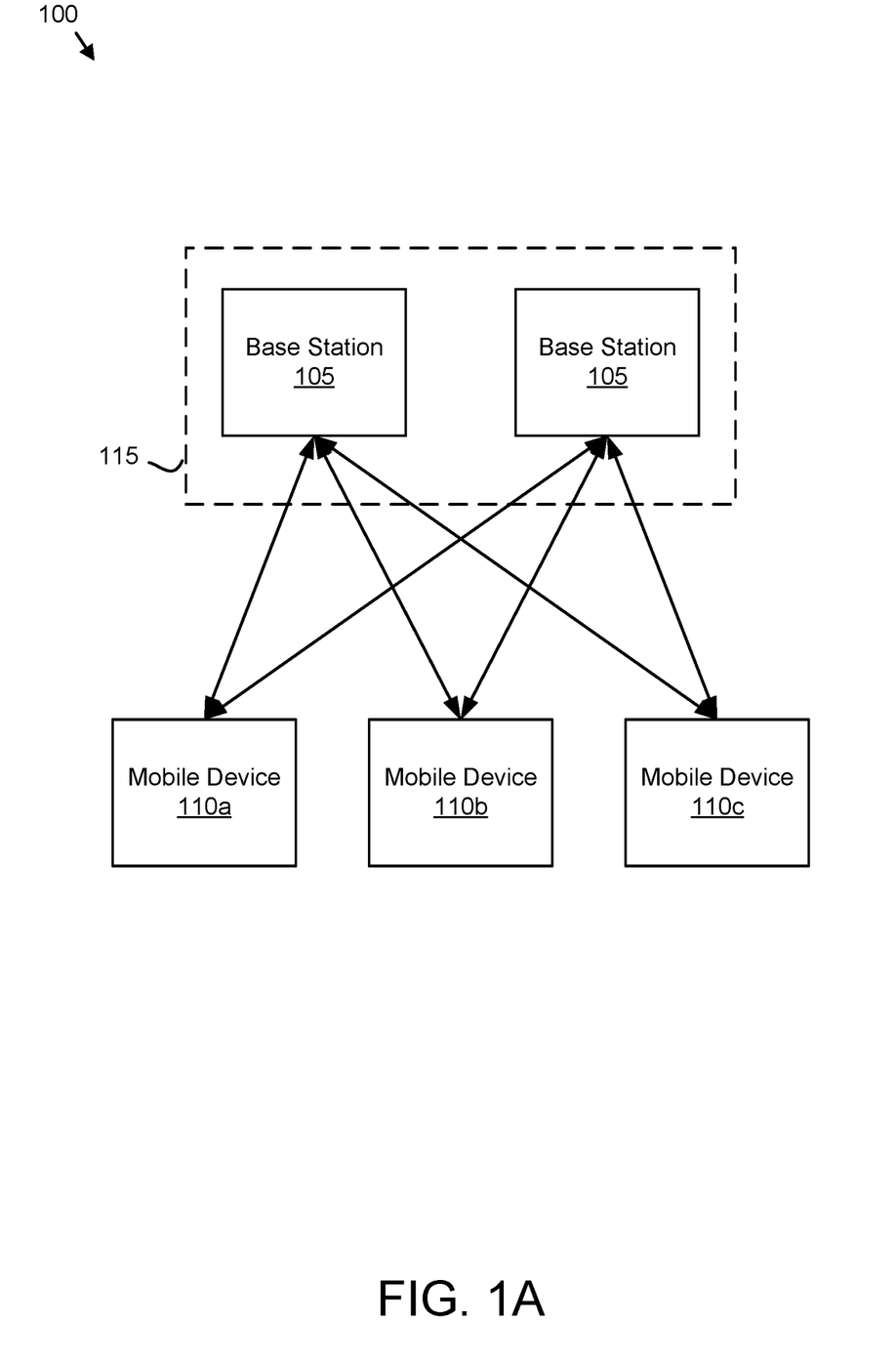
FIG. 1A is a schematic block diagram illustrating one embodiment of a communication system.

FIG. 1A is a schematic block diagram illustrating one embodiment of a communication system 100. The system 100 includes one or more base station 105 and one or more mobile devices 110. The base stations 105 may communicate wirelessly with the mobile devices 110. The base stations 105 may be a gNodeB (gNB) base station, an evolved node B (eNB) Long Term Evolution (LTE) base station, and the like. The base stations may form a network 115. The mobile devices 110 may be User Equipment (UE) such as a mobile telephone, a machine-type communications (MTC) device, a tablet computer, a laptop computer, and embedded communication devices in automobiles, kiosks, appliances, and the like.

In order to reduce the signaling load for the provisioning of system information, minimum system information may be communicated to mobile devices 110. The minimum System Information (SI) which contain basic information for initial access to the cell, e.g. System Frame Number (SFNO, list of Public Land Mobile Network (PLMN), cell camping parameters, RACH parameters, are always broadcast periodically in a cell, whereas the other "non-minimum" System Information doesn't necessarily need to be periodically broadcast, i.e. it's a network decision. The other system information instances can be provided on-demand to the mobile devices 110, i.e. mobile device 110 can request for it. Delivery of other SI can be done by broadcast or unicast manner. The minimum SI indicates whether a specific SIB is periodically broadcasted or provided on-demand. In order to obtain the one or more SIBS which are not periodically broadcasted and are provided on-demand, the mobile device 110 may initiate an on-demand SI acquisition procedure. For an SI required by the mobile device 110, the mobile device 110 should know whether the SI is available in the cell and whether it is broadcast or not before the mobile device 110 sends the other SI request, i.e. the mobile device 110 shall first acquire the minimum SI. The scheduling information for other SI which are provided by Minimum SI, e.g. in SIB1, should include SIB type, validity information, periodicity, SI-window information. For mobile devices 110 in connected, dedicated Radio Resource Control (RRC), signaling can be used for the request and delivery of other SI.

The mobile device 110 in idle and inactive state can request other SI without state transition using a Msg1- and/or Msg3-based approach. The Msg3-based SI request approach is shown hereafter in FIG. 3A. The Msg1-based SI request approach is shown in FIG. 3B. The mobile device 110 may transmit a Physical Random Access Channel (PRACH) preamble in a specific PRACH resource specific to a System Information Block (SIB) or set of SIBs (called SI message) which the mobile device 110 wants to obtain. It is assumed that PRACH preamble/resource specific to each SIB or set of SIBs are reserved and indicated in periodically broadcasted minimum SI.

In the Msg1-based approach for requesting other SI the mobile device 110 sends a (reserved) PRACH preamble in order to indicate to the base station 105 the SIBS the mobile device 110 wants to obtain. The mobile device 110 will subsequently monitor during the corresponding SI window, as provided in the scheduling information in minimum SI, and try to acquire the requested SIBs. However, a mobile device 110 may need many SIs (containing SIM of its interest) some of which are linked to a different Preamble as in the below example including: SI Message1—Reserved Preamble 1; SI Message2—Reserved Preamble 2. The foregoing is an example and does not imply that SI Message1 is the first message in the Scheduling Info list.

Problem 1—Msg1-Based Method

For on-demand SI requests, RRC selects the preamble (based on the scheduling info) and tells the preamble to a Media Access Controls (MAC). Then the question is if the mobile device 110 requires and determines based on the scheduling information that both SIs 1 and 2 (with different corresponding preambles 1 and 2 as in the above example) need to be requested, will the corresponding two preambles be given to MAC one by one or in a single reply. In addition, is this considered as one-single RACH procedure or multiple. For a joint procedure, MAC may provide a single success/failure to RRC and RRC may un-necessarily re-initiate the Msg1 transmission of even the successfully received SI requests in the network, or, worse may Barr the base station 105 even if the failed RACH corresponded to a non-essential SI/SIB.

Problem 2—Msg3-Based Method

Figure 3A:
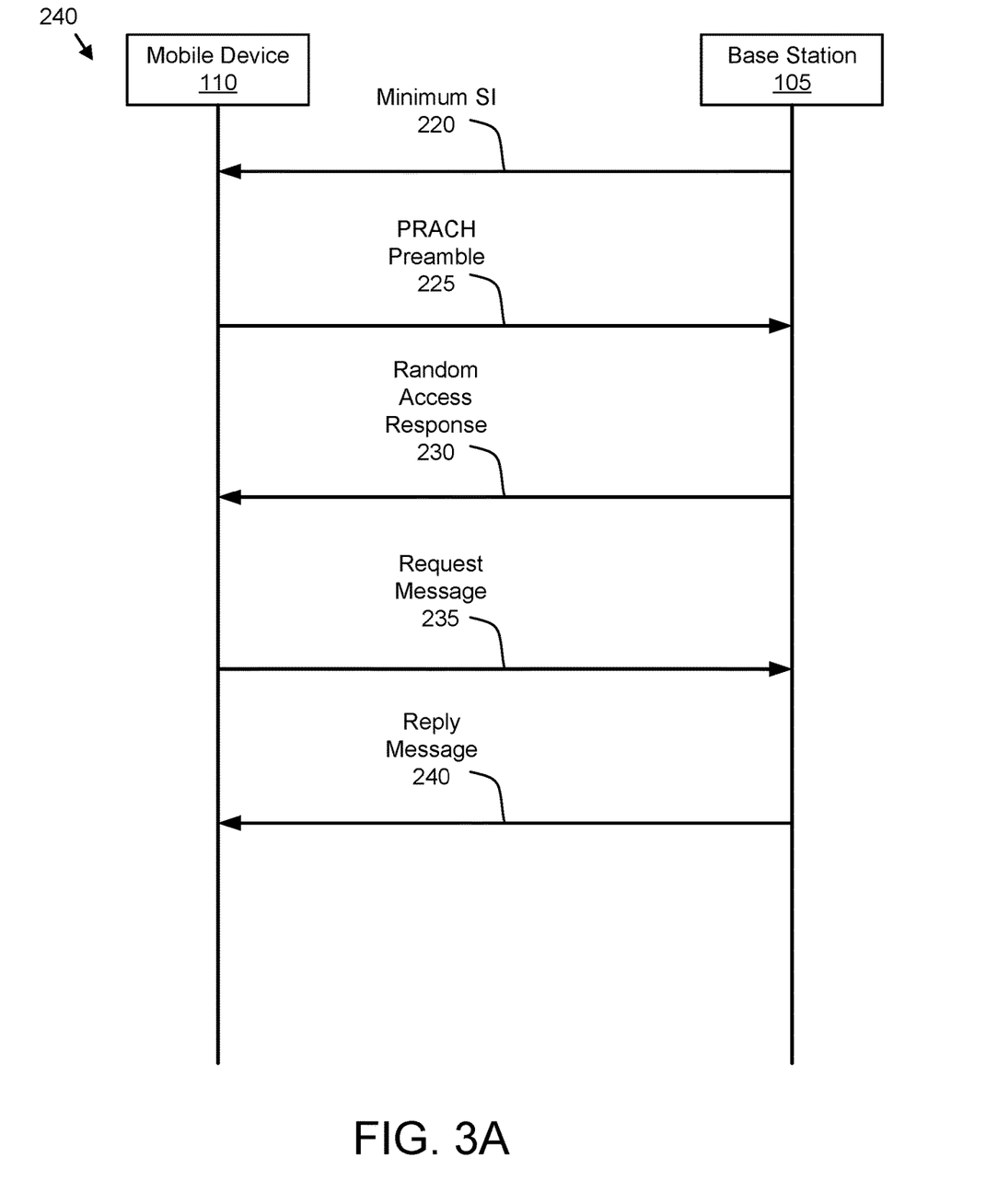
FIG. 3A is a diagram illustrating one embodiment of system information communication.
Figure 3B:
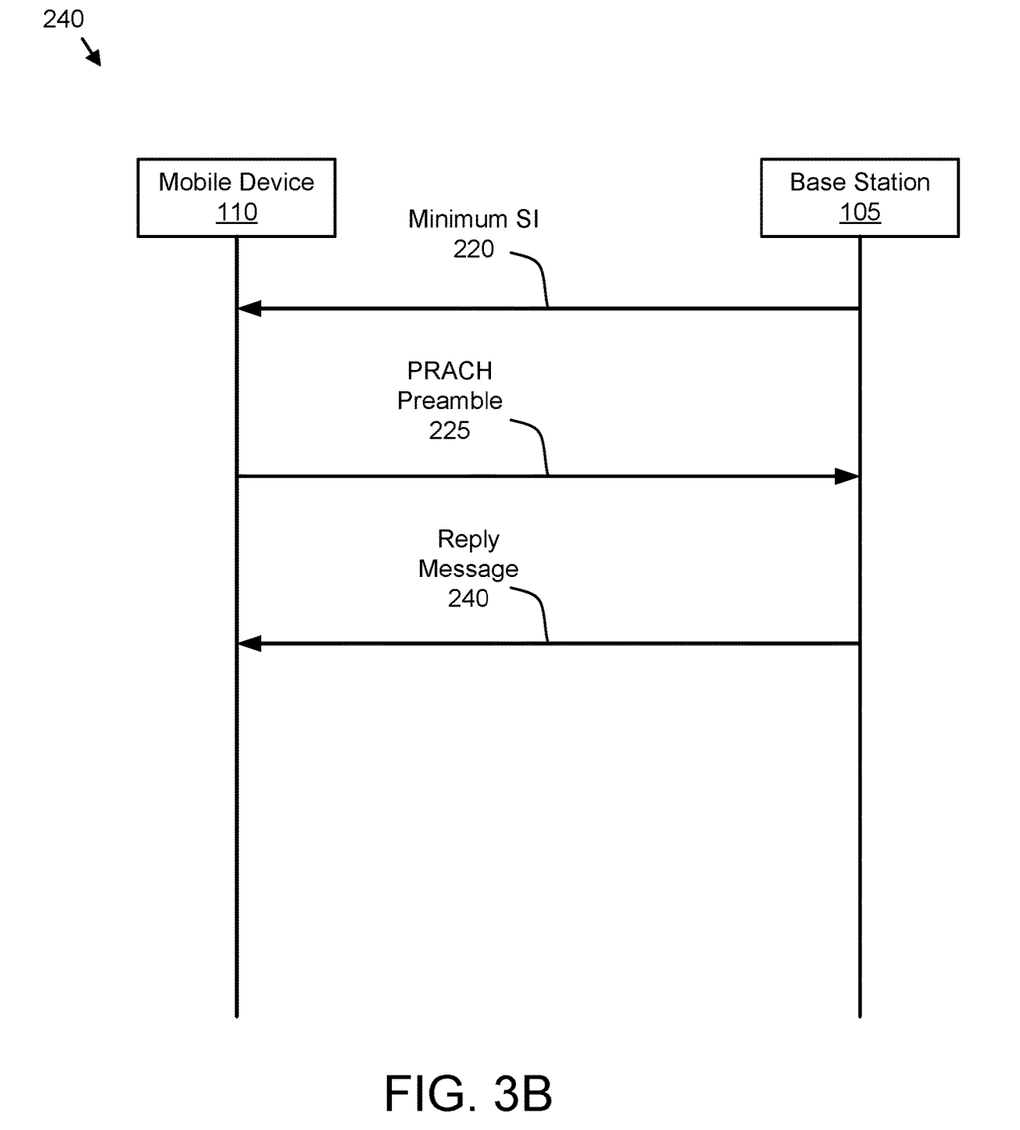
FIG. 3B is a diagram illustrating one alternate embodiment of system information communication.

In case of a four step RACH procedure as shown in FIG. 3A, there might be contention when two mobile devices 110 transmitting Msg1 (Random Access Preamble) assume that the Msg2 (MAC Random Access Response) is for each mobile device 110. Here contention is resolved in Msg4, where the network 115 just replays at least a portion of the Msg3 content back in Msg4 (e.g. first 40 bits for Msg3) and the mobile device MAC verifies if the received Msg4 contains its Msg3 content. In case of SI requests, a contention resolution (CR) per se is not required since all that is important to a mobile device 110 is to know if the network 115 acknowledges the corresponding SI requests or not—an Acknowledgement may come in Msg4 because of "other" mobile devices 110 requesting the same SI(s) as a current mobile device 110. However, since the Msg4 content may appear different, such as a subset/superset and/or other information like padding or random number included in Msg3, from what the current mobile device 110 transmitted in Msg3, the contention would appear to have failed and the mobile device 110 will keep on retransmitting PRACH, wasting battery and delaying the SI acquisition un-necessarily.

Currently, in LTE the mobile device 110 is not allowed to run more than one RACH procedures in parallel i.e. a new RACH procedure is to be initiated only when the previous one has been concluded. This principle may incur delay in SI acquisition and in some case e.g. depending on the criticality of required SIB, PRACH resources availability etc., the delay can be unacceptable. The embodiments accelerate the acquisition of the SI as will be described hereafter.

Figure 1B:
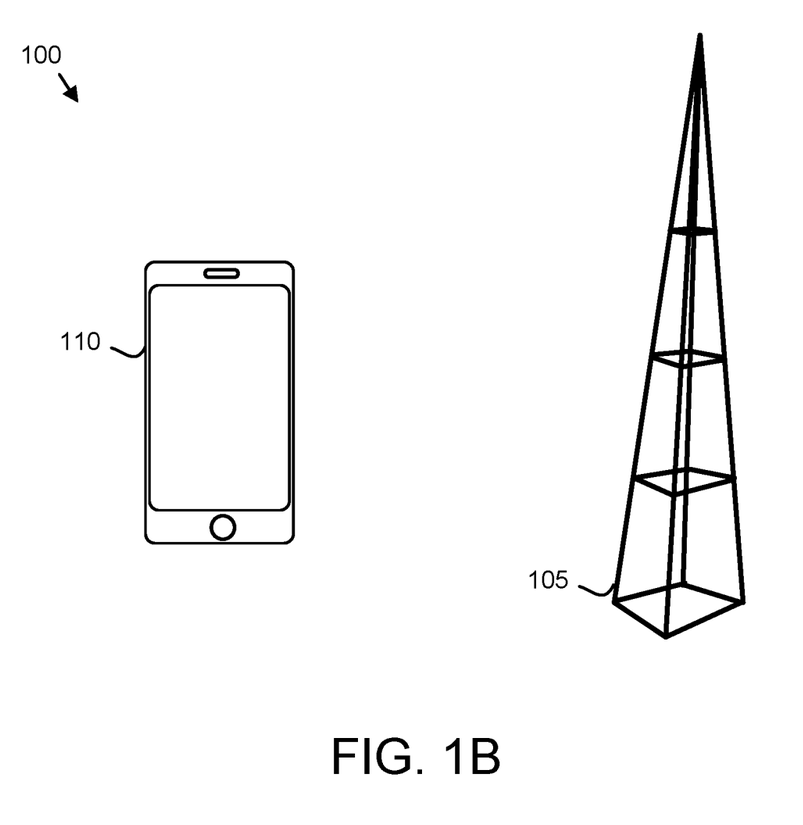
FIG. 1B is a front view drawing illustrating one embodiment of a communication system.

FIG. 1B is a front view drawing illustrating one embodiment of a communication system 100. A mobile telephone mobile device 110 and transmission tower base station 105 are depicted.

Figure 2A:
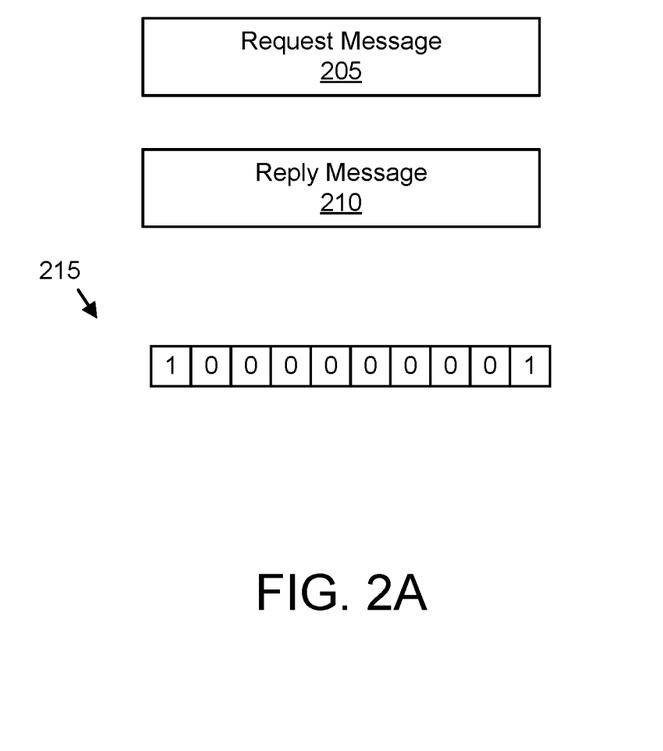
FIG. 2A is a schematic block diagram illustrating one embodiment of system data.

FIG. 2A is a schematic block diagram illustrating one embodiment of system data. The system data may be organized as a data structure in a memory and/or transmitted wirelessly. In the depicted embodiment, the system data includes a request message 205, a reply message 210, and a bitmap 215. The request message 205 may request SI from the network 115. The request message 205 may be a preamble, a time-frequency resource, and/or a RACH request. In one embodiment, the request message 205 is an RRC message. In a certain embodiment, the request message 205 is a MAC Control Element (CE). The reply message 210 may provide SI from the network 115. The reply message 210 may be an RRC message. In addition, the reply message 210 may be MAC CD message.

The bitmap 215 may be a request bitmap 215 and/or a reply bitmap 215. The request message 205 may include a request bitmap 215. The reply message 210 may include a reply bitmap 215. In one embodiment, the request bitmap 215 and/or reply bitmap 215 comprises 40 bits. The bitmap 215 may provide information about the SI as will be described hereafter.

Figure 2B:
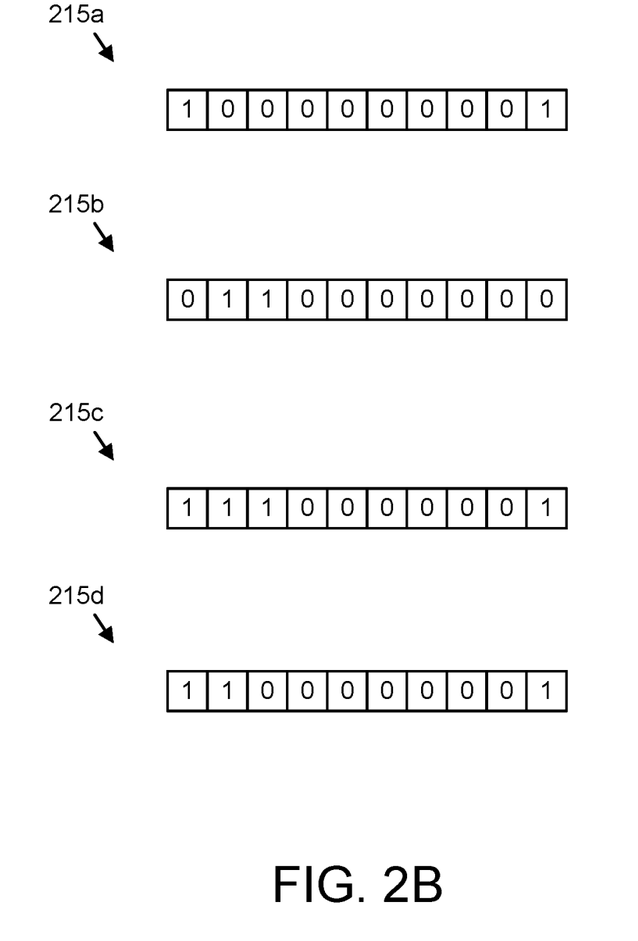
FIG. 2B is a schematic block diagram illustrating one embodiment of bitmaps.

FIG. 2B is a schematic block diagram illustrating one embodiment of bitmaps 215. Four examples of 10-bit bitmaps 215 are illustrated. The bitmaps 215a-d will be described hereafter.

FIG. 3A is a diagram illustrating one embodiment of system information communication. In the depicted embodiment, the base station 105 makes a periodic broadcast 220 of minimum SI. The mobile device 110 may communicate a PRACH preamble transmission 225. The base station 105 may communicate a random access response 230. The mobile device 110 may communicate a system information request 235 in request message 205. The base station 105 may transmit the requested SI 240 in a reply message 210.

Two embodiments of system information communication may be employed depending on if the network 115 can combine the responses (for different SI requests from more than one mobile device 105) and send the Acknowledgement (Msg4) on a common Radio Network Temporary Identifier (RNTI).

Embodiment 1: Combining of Multiple Acknowledgements (Msg4)

In one embodiment, the mobile device 110 may indicate all the SI messages the mobile device 110 needs to the network 115 in Msg3 e.g. using bitmap 215a. In one example, where the 10 bits "map" to 10 corresponding SIs (or group of SIs) such that first bit is for SI Message1, second bit is for SI Message2, and so on. In the above example, the mobile device 110 sending '1 0 0 0 0 0 0 0 0 1' requests the network 115 to provide SI Message1 and SI Message10. The network 115 may in turn receive a request message 205 from another mobile device 110 requesting a different set of SIs (for example, SI Message2 and SI Message3) as illustrated in bitmap 215b. If the network 115 combines the responses, the combined Acknowledgement (Msg4) is illustrated in bitmap 215c.

Further, an LTE-like MAC behavior may try to perform CR and compare the first 48 bits, as an example, containing also the 10-bit bitmap 215 and since the bitmap 215 sent in Msg3 is not exactly the one received in the combined Acknowledgement (Msg4), the CR will fail. To overcome this, following solution embodiments may be employed.

In embodiment A, CR is performed by the RRC. So, the RRC will indicate to MAC that the Preamble (Msg1) transmission is for SI-requests and based on this, upon reception of Msg4 subsequently, MAC will skip the CR and pass the Msg4 RRC parts to RRC layer. RRC will interpret the bitmap 215 and conclude if the RRC request was received by the network 115 (i.e. the corresponding bits for the required SIs in the combined Acknowledgement (Msg4) bitmap 215 is set or not). In case of a failed CR, the RRC may re-initiate the procedure.

In embodiment B, the RRC will inform MAC about the bits in the bitmap 215 that may be ignored while performing CR. So, in the above example, the first mobile device MAC shall ignore the Bits [2]-[9]. If the result of CR after this ignoring the bits is successful, then MAC informs RRC and RRC configures lower layers to acquire SIs according to the scheduling info. In case of "partial" success where only some of the requested SIs where acknowledged by the network 115, MAC will indicate the partial success to RRC. The mobile device 110 may re-try to request for other not-yet-acknowledged SI and also in the meantime configures lower layers to acquire acknowledged SIs according to the scheduling info.

Embodiment 2: Combining of Multiple Acknowledgements (Msg4) is NOT Done

In one embodiment, a contention happens and both mobile devices 110 assume that the Msg2 is for them and use the UL grant in Msg2 to send the Msg3. A first mobile device 110a may send bitmap 215a in Msg3. A second mobile device 110b may send bitmap 215d in Msg3. Further, the network 115 may receive successfully the Msg3 only from the second mobile device 110b and therefore would replay the CR identity in Msg4 Acknowledgement including the 10 bit bitmap 215d sent by the second mobile device 110b in Msg3. An LTE like MAC behavior in the first mobile device 110a may try to perform CR and compare the first 48 bits containing the 10-bit bitmap 215d. Since the bitmap 215d sent in Msg3 is not exactly the one received in the combined Acknowledgement (Msg4), the CR will fail. This will be unfortunate since the SI requested by the first mobile device 110a is actually acknowledged to be transmitted by the network, even if the network did not receive the first mobile device's SI request. To overcome this, the embodiments may perform the following.

In one embodiment, the CR is performed by RRC. So, RRC will indicate to MAC that the Preamble (Msg1) transmission is for SI-requests and based on this upon reception of Msg4 subsequently, MAC will skip the CR and pass the Msg4 RRC parts to RRC layer. RRC will interpret the bitmap 215 and conclude if the mobile device's request was received by the network 115 (i.e. the corresponding bits for the required SIs in the combined Acknowledgement (Msg4) bitmap 215 is set or not). In case of a failed CR, the RRC may re-initiate the procedure.

In one embodiment, the RRC will inform MAC about the bits in the bitmap 215 that may be ignored while performing CR. So, in the above example, the first mobile device MAC shall ignore the second until the $9^{th}$ Bit. If the result of CR after this ignoring the bits is successful, then MAC informs RRC and RRC configures lower layers to acquire SIs according to the scheduling info. In case of "partial" success where not all of the requested SIs where acknowledged by the network 115, MAC will indicate the partial success to RRC. The mobile device 110 may re-try to request for other not-yet-acknowledged SI and also in the meantime configures lower layers to acquire acknowledged SIs according to the scheduling info.

In one embodiment, both embodiments A) and B) are same and therefore, irrespective of whether combining of multiple Acknowledgements (Msg4) is done or not these embodiments will optimize mobile device SI request and acquisition.

Embodiment C: Msg3 is a MAC CE and not an RRC Message

In one embodiment, with the same background as above (where Msg3 and Msg4 are RRC messages), RRC provide the information to the MAC as to which SIs are to be requested and accordingly which bits in the bitmap 215 need to be set. MAC upon receiving Msg4 needs to perform CR for only the bits that were set by the mobile device 110 (not full 48 bits like comparison). Based on this comparison, MAC will conclude if the mobile device's request was received by the network 115 (i.e. the corresponding bits for the required SIs in the combined Acknowledgement (Msg4) bitmap 215 is set or not). In case of success, MAC will indicate to RRC "success" and RRC in turn may configure lower layers such as a physical layer to acquire acknowledged SIs according to the scheduling info. In case of a "failure" when none of the corresponding bits for the required SIs in the combined Acknowledgement (Msg4) bitmap 215 is set, the RRC may re-initiate the procedure. In response to a "partial" success where only one/some of the requested SIs where acknowledged by the network 115, MAC will indicate the partial success to RRC. The mobile device 215 may re-try to request for other not-yet-acknowledged SI and also in the meantime configures lower layers to acquire acknowledged SIs according to the scheduling info.

FIG. 3B is a diagram illustrating one alternate embodiment of system information communication. In the depicted embodiment, the base station 105 makes a periodic broadcast 220 of minimum SI. The mobile device 110 may communicate a PRACH preamble transmission 225. The base station 105 may transmit the requested SI 240 in a reply message 210.

An RRC may determine which SIs/SIBS are required by the mobile device 110 and also determine for which SI message the configured PRACH occasion is available earliest in time. RRC will indicate this Preamble and PRACH resources to lower layers such as MAC and a physical layer. The next one available in time is indicated next to MAC. In this case, the next RACH procedure is started upon MAC indicating successful RACH completion to RRC i.e. MAC verifies that one of the RAPID (preamble id) contained in the Msg2 was used for the Msg1 transmission. There may be one RACH procedure at a time and therefore Backoff, if present, applies only to the current RACH procedure.

In one embodiment, RRC shall indicate all the Preambles to MAC at once. The MAC may respond in one of two ways as described below.

Staggered or Serial PRACH Transmissions

In one embodiment, MAC staggers the Preamble transmission (starts Msg1 transmission for the Nth Preamble with or without waiting for Msg2 for the last transmitted Msg1 for (N−1)th Preamble). Depending on the PRACH occasions (especially the time locations), MAC may or may not receive the Msg2 (RAR) for the first initiated RACH procedure (i.e. to the Msg1 for SI Message1) before the PRACH occasion (especially the time location) for transmitting the second Msg2 (for SI Message2) becomes available. This is treated as two separate RACH procedures irrespective of the time of transmission of the respective two Msg1 s. The Msg1 for the second procedure can be transmitted before receiving the Msg2 (RAR) for the first initiated RACH procedure (i.e. to the Msg1 for SI Message1). RRC is informed of the success/failure for each of the two procedures separately and then RRC takes decision for each success/failure. Since, the two RACH procedures are treated as separate, Backoff if present applies only to the RACH procedure where the Msg2 is received in the corresponding RAR window or on the RA-RNTI calculated from the t-f resources of the corresponding PRACH resources. In one further embodiment, a joint Success is indicated to RRC when all Msg1 transmission has been successful, but if any Msg1 transmission could not succeed then the corresponding failure is indicated individually to RRC.

In one embodiment, MAC unifies the RACH requests by either Code multiplexing Preambles (MUX preambles and send them in one shot i.e. in the same t-f resources) or by using two different frequency resources but on the same time occasion. This option is available only for mobile devices 110 that are capable of unifying multiple PRACH transmission.

Figure 4A:
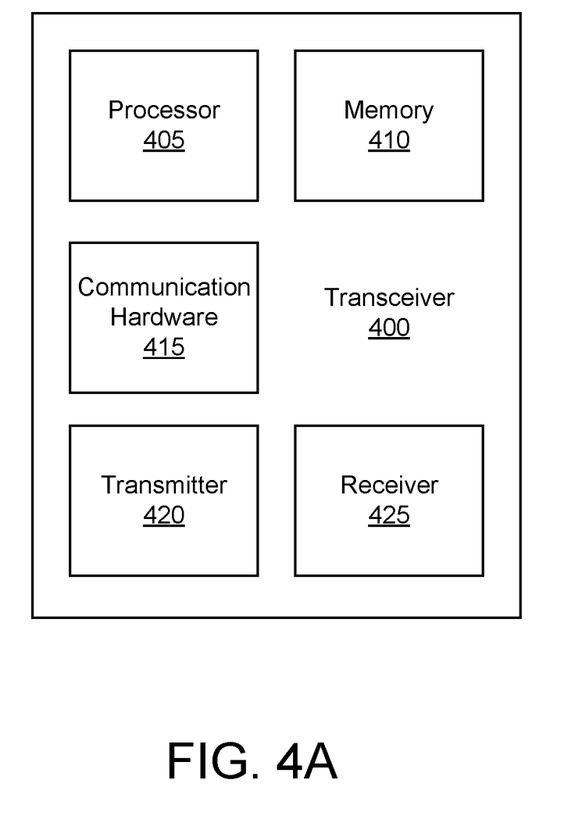
FIG. 4A is a schematic block diagram illustrating one embodiment of a transceiver.

FIG. 4A is a schematic block diagram illustrating one embodiment of a transceiver 400. The transceiver 400 may be embodied in the base station 105 and/or the mobile device 110. In the depicted embodiment, the transceiver 400 includes a processor 405, a memory 410, communication hardware 415, a transmitter 420, and receiver 425. The memory 410 may include a semiconductor storage device, a hard disk drive, or combinations thereof. The memory 410 may store code. The processor 405 may execute the code. The communication hardware 415 may communicate with the transmitter 420 and/or receiver 425. The transmitter 420 may transmit wireless signals. The receiver 425 may receive wireless signals.

Figure 4B:
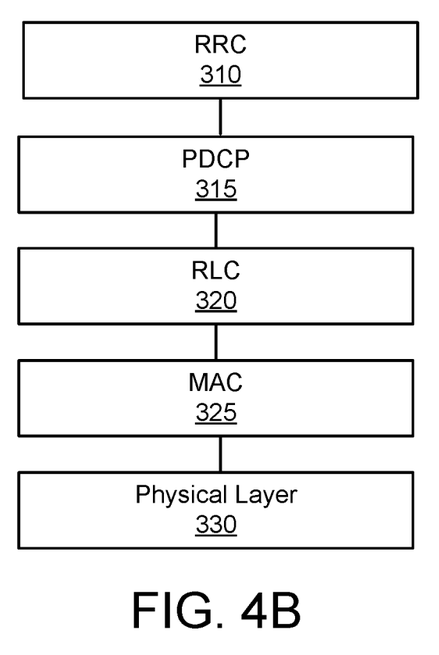
FIG. 4B is a schematic block diagram illustrating one embodiment of a communication stack.

FIG. 4B is a schematic block diagram illustrating one embodiment of an LTE communication stack in the mobile device 110. In the depicted embodiment, the communication stack includes the RRC 310, a Packet Data Convergence Protocol (PDCP) 315, a Radio Link Control (RLC) 320, the MAC 325, and the physical layer 330.

Figure 5A:
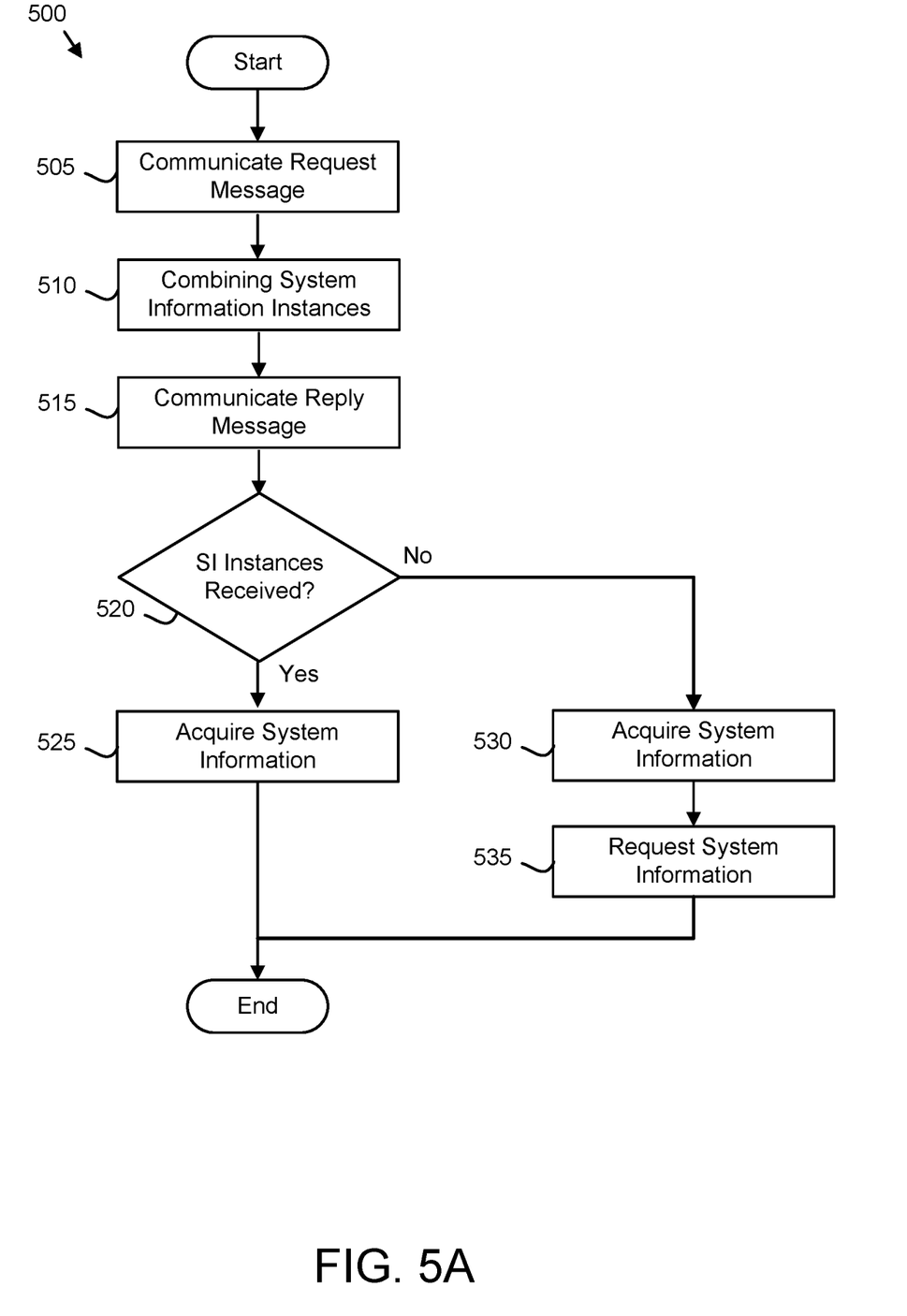
FIG. 5A is a schematic flow chart diagram illustrating one embodiment of a system information communication method.

FIG. 5A is a schematic flow chart diagram illustrating one embodiment of a system information communication method 500. The method 500 may acquire system information instances for one or more mobile devices 110. The method 500 may perform the system information communication illustrated in FIG. 3A. The method 500 may be performed by the one or more processors 405 of mobile devices 110 and/or base stations 105.

The method 500 starts, and in one embodiment, the one or more processors 405 of a mobile device 110 communicates 505 a request message 205 for one or more system information instances from the mobile device 110 to the base station 105. The request message 205 may include a request bitmap 215 indicating the requested system information instances.

In one embodiment, the RRC 310 communicates to the MAC 325 that the request message 205 is for system information. In a certain embodiment, the RRC 310 communicates to the MAC 325 bits in each bitmap 215 that are ignored for contention resolution.

The processor 405 of the base station 105 may receive two or more request messages 205 from two or more mobile devices 110 and combine 510 system information instances for the two or more request messages 205 into a single reply message 210. In one embodiment, each request message 205 comprises the request bitmap 215 indicating the requested system information instances. The processor 405 of the base station 105 may further communicate 515 the single reply message 210 with the reply bitmap 215 indicating the system information instances in the single reply message 210.

The processor 405 of the base station 105 may communicate 515 and the mobile device 110 may receive the reply message 210 from the base station 105. The reply message

210 may include a reply bitmap 215 indicating the system information instances in the reply message 210.

The processor 405 of the mobile device 110 may determine 520 if the one or more system information instances requested in the request message 205 are received in the reply message 210 from the base station 105. The processor 405 may determine 520 the received system information instances from the reply bitmap 215. For example, each set reply bitmap bit may indicate a received system information instance.

In one embodiment, in response to receiving the reply message 210, the MAC 325 omits contention resolution for the reply message 210 and passes the reply message 210 to the RRC 310. The RRC 310 may interpret the reply bitmap 215 of the reply message 210 to determine if the one or more system information instances are received.

In a certain embodiment, in response to receiving a reply message 210, the MAC 325 performs CR. In response to a successful CR, the MAC 325 may inform the RRC 310 of the bits in the reply bitmap 215.

If the one or more system information instances requested in the request message 205 are received, the processor 405 of the mobile device 110 may acquire 525 the system information instances indicated in the request bitmap 215 and the reply bitmap 215 from the reply message 210 and the method 500 ends. The mobile device 110 may acquire 525 the system information instances indicated in both the request bitmap 215 and the reply bitmap 215 from the reply message 210.

The RRC 310 may configure the physical layer 330 to acquire system information instances based on the bits of the reply bitmap 215. For example, the RRC 310 may direct the physical layer 330 to acquire each system information instance corresponding to a set bit in the reply bitmap 215.

In one embodiment, for combined system information instances for two or more request messages 205 from two or more mobile devices 110, each mobile device 110 ignores system information instances not indicated in the request bitmap 215 from the mobile device 110.

If the one or more system information instances requested in the request message 205 are not received, the processor 405 of the mobile device 110 may acquire 530 a subset of the one or more information instances as indicated by the reply bitmap 215. For example, if a first and fourth system information instance was requested and only the fourth system information instance was indicated in the reply bitmap 215, the processor 405 may acquire 530 the fourth system information instance.

The processor 405 of the mobile device 110 may further request 535 the system information instances from the base station 105 that are indicated in the request bitmap 215 and not indicated in the reply bitmap 215 and the method 500 ends. Continuing the example above, the processor 405 may request 535 the first system information instance that was requested and not received.

In one embodiment, the RRC 310 generates a second request message 205 for system information instances not indicated by the bits of the reply bitmap 215. For example, if the system information instance corresponding to a first bit of the request bitmap 215 was not received, as indicated by the first bit of the reply bitmap 215 not being set, the RRC 310 may generate the second request message 205. The second request message 205 may include a second request bitmap 215 with the first bit set.

In one embodiment, for combined system information instances for two or more request messages 205 from two or more mobile devices 110, each mobile device 110 re-requests 535 previously requested system information instances not transmitted in the single reply message 210.

Figure 5B:
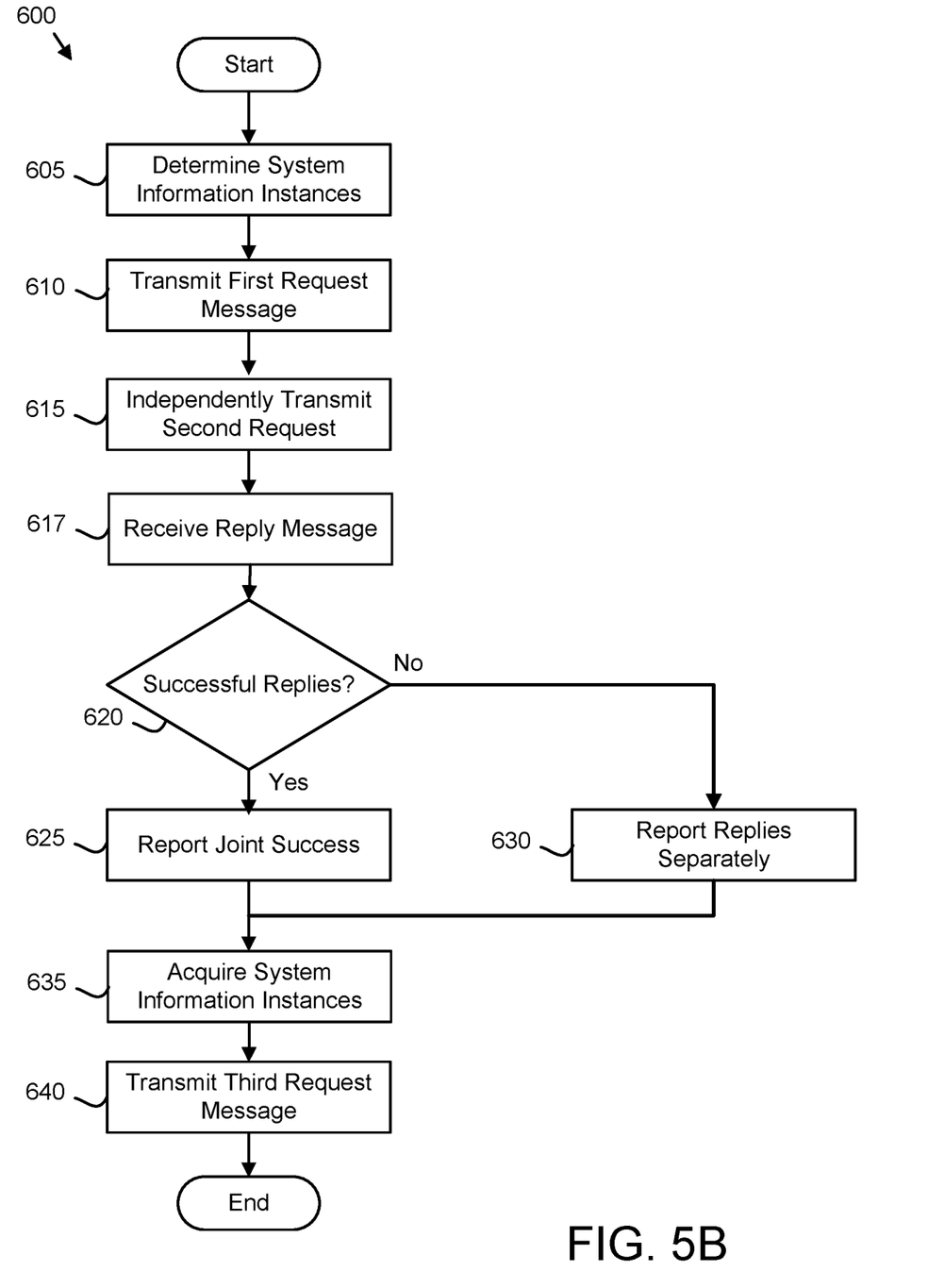
FIG. 5B is a schematic flow chart diagram illustrating one alternate embodiment of a system information communication method.

FIG. 5B is a schematic flow chart diagram illustrating one alternate embodiment of a system information communication method 600. The method 600 may transmit request messages 205 and acquire system information instances. The method 600 may perform the system information communication illustrated in FIG. 3B. The method 600 may be performed by the one or more processors 405 of mobile devices 110 and/or base stations 105.

The method 600 starts, and in one embodiment, the processor 405 of the mobile device 110 determines 605 to request at least two system information instances from a base station 105. The processor 405 may further transmit 610 a first request message 205 requesting a first system information instance of the at least two system information instances.

In addition, the processor 405 may transmit 615 a second request message requesting a second system information of the at least two system information instances. The first request message 205 and the second request message 205 may be one of a preamble and a time-frequency resource. The first request message 205 and the second request message 205 may be transmitted as a RACH request. In one embodiment, a transmission of the first request message 205 and the second request message 205 may be mutually independent. In one embodiment, the RRC 310 communicates to the MAC 325 that the first and second request messages are for system information.

The processor 405 of the mobile device 110 may receive 617 a reply message 210. The processor 405 of the mobile device 110 may further determine 620 if there are successful replies to each request message 205 in the reply message 210. In one embodiment, in response to receiving the reply message 210, the MAC 325 passes the reply message 210 to the RRC 310. The RRC 310 may determine if the at least two system information instances are received from the reply message 210.

In one embodiment, the MAC 325 performs CR. In response to a successful CR, the MAC 325 informs the RRC 310 of received system information. The RRC 310 may configure the physical layer 330 to acquire system information instances based on the received system information.

If there are successful replies in reply messages 210 to both request messages 205 the processor 405 reports 625 joint success. In response to at least one unsuccessful reply in a reply message 210 to any request message 205, the processor 405 reports 630 each reply separately.

The processor 405 of the mobile device 110 may acquire 325 the received system information instances. In addition, the processor 405 may request system information instances not received with the received system information and the method 600 ends. In one embodiment, the RRC 310 transmits a third RACH request message 210 requesting system information instances not received with the received system information.

INDUSTRIAL APPLICATION

Base stations 105 regularly provide system information to mobile devices 110. To reduce the signaling load of providing system information, the embodiments support the provision of needed system information such as non-minimum system information as system information instances. Each system information instance may comprise a portion of the system information needed by a mobile device 110 The embodiments allow a mobile device 110 to request and acquire discrete system information instances. As a result, the communication of system information to mobile devices 110 is reduced while providing the mobile devices 110 with needed system information. The embodiments further mitigate unwanted delays waiting for a RACH to complete. Thus, the embodiments reduce the signaling load of providing system information to the mobile devices 110 and speed the acquisition of system information.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining, by use of a Radio Resource Control (RRC), required system information;
   iteratively determining a next system information message required;
   indicating each next required system information message by way of including at least one Random Access Preamble for Physical Random Access Channel (PRACH) occasions for SI request to a Media Access Control (MAC) to initiate a Random Access Channel (RACH) for a corresponding system information request;
   starting, by use of the MAC, the RACH;
   determining a RACH completion in response to a first preamble identifier for a second message being used in a first message;
   indicating, by use of the MAC, reception of an acknowledgement for the requested system information message and/or RACH to the RRC; and
   in response to the MAC indicating the RACH completion to the RRC, starting a next RACH.

2. The method of claim 1, the method further comprising receiving an acknowledgement for a system information instance request and/or RACH at the RRC.

3. The method of claim 1, wherein the request is an RRC message.

4. The method of claim 1, wherein the request is a MAC Control Element (CE) message.

5. The method of claim 1, wherein the acknowledgement is an RRC message.

6. The method of claim 1, wherein the acknowledgement is a MAC CE message.

7. The method of claim 1, wherein each mobile device re-requests previously requested system information instances not transmitted in the acknowledgement.

8. An apparatus comprising:
   a processor performing:
   determining, by use of a Radio Resource Control (RRC), required system information;
   iteratively determining a next system information message required;
   indicating each next required system information message by way of including at least one Random Access Preamble for Physical Random Access Channel (PRACH) occasions for SI request to a Media Access Control (MAC) to initiate a Random Access Channel (RACH) for a corresponding system information request;
   starting, by use of the MAC, the RACH;
   determining a RACH completion in response to a first preamble identifier for a second message being used in a first message;
   indicating, by use of the MAC, reception of an acknowledgement for the requested system information message and/or RACH to the RRC; and
   in response to the MAC indicating the RACH completion to the RRC, starting a next RACH.

9. The apparatus of claim 8, the processor further receiving an acknowledgement for a system information instance request and/or RACH at the RRC.

10. The apparatus of claim 8, wherein the request is an RRC message.

11. The apparatus of claim 8, wherein the request is a MAC Control Element (CE) message.

12. The apparatus of claim 8, wherein the acknowledgement is an RRC message.

13. The apparatus of claim 8, wherein the acknowledgement is a MAC CE message.

14. The apparatus of claim 8, wherein each mobile device re-requests previously requested system information instances not transmitted in the acknowledgement.

15. A program product comprising a non-transitory computer readable storage medium that stores code executable by a processor, the executable code comprising code to perform:
    determining, by use of a Radio Resource Control (RRC), required system information;
    iteratively determining a next system information message required;
    indicating each next required system information message by way of including at least one Random Access Preamble for Physical Random Access Channel (PRACH) occasions for SI request to a Media Access Control (MAC) to initiate a Random Access Channel (RACH) for a corresponding system information request;
    starting, by use of the MAC, the RACH;
    determining a RACH completion in response to a first preamble identifier for a second message being used in a first message;
    indicating, by use of the MAC, reception of an acknowledgement for the requested system information message and/or RACH to the RRC; and
    in response to the MAC indicating the RACH completion to the RRC, starting a next RACH.

16. The program product of claim 15, the processor further receiving an acknowledgement for a system information instance request and/or RACH at the RRC.

17. The program product of claim 15, wherein the request is an RRC message.

18. The program product of claim 15, wherein the request is a MAC Control Element (CE) message.

19. The program product of claim 15, wherein the acknowledgement is an RRC message.

20. The program product of claim 15, wherein the acknowledgement is a MAC CE message.

* * * * *